(12) United States Patent
Kawano et al.

(10) Patent No.: US 7,304,790 B2
(45) Date of Patent: Dec. 4, 2007

(54) EXAMINATION APPARATUS AND FOCUSING METHOD OF EXAMINATION APPARATUS

(75) Inventors: Yoshihiro Kawano, Hachioji (JP); Isao Ishibe, Mishima (JP); Yoshihisa Tanikawa, Chuo-ku (JP); Atsuhiro Tsuchiya, Hachioji (JP)

(73) Assignee: Olympus Corporation, Tokyo (JP)

( * ) Notice: Subject to any disclaimer, the term of this patent is extended or adjusted under 35 U.S.C. 154(b) by 91 days.

(21) Appl. No.: 11/090,036

(22) Filed: Mar. 28, 2005

(65) Prior Publication Data

US 2005/0219688 A1 Oct. 6, 2005

(30) Foreign Application Priority Data

Mar. 30, 2004 (JP) .............................. 2004-100439

(51) Int. Cl.
*G02B 21/00* (2006.01)
(52) U.S. Cl. .................................... 359/383; 250/201.3
(58) Field of Classification Search ................ 359/383, 359/385, 368; 250/201.3
See application file for complete search history.

(56) References Cited

U.S. PATENT DOCUMENTS

| | | | | |
|---|---|---|---|---|
| 5,932,872 A | * | 8/1999 | Price | .................... 250/201.3 |
| 6,072,899 A | * | 6/2000 | Irie et al. | .................... 382/149 |
| 7,109,459 B2 | * | 9/2006 | Kam et al. | .................... 250/201.4 |

FOREIGN PATENT DOCUMENTS

JP 09-218355 8/1997

* cited by examiner

*Primary Examiner*—Alessandro Amari
(74) *Attorney, Agent, or Firm*—Kenyon & Kenyon LLP

(57) ABSTRACT

A focusing method for an examination apparatus that can quickly and easily perform focusing for fluoroscopy is provided. The focusing method, for an examination apparatus that can observe fluorescence emitted from a specimen, includes a first step of irradiating the specimen with light via an objective lens to generate reflected light and fluorescence; a second step of performing focusing with respect to the surface of the specimen using the reflected light from the specimen; and a third step of performing focusing for the fluorescence based on the focal position of the specimen surface in the second step.

13 Claims, 12 Drawing Sheets

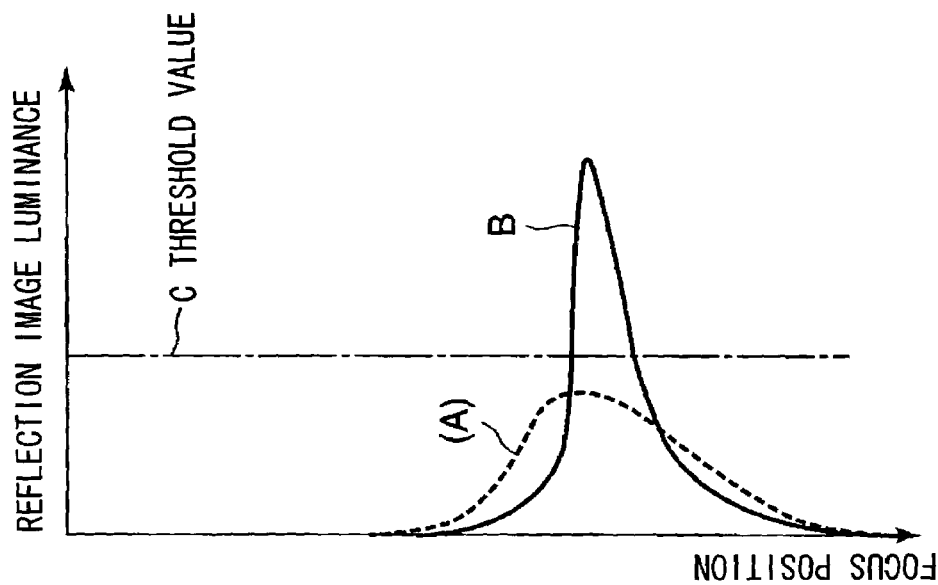
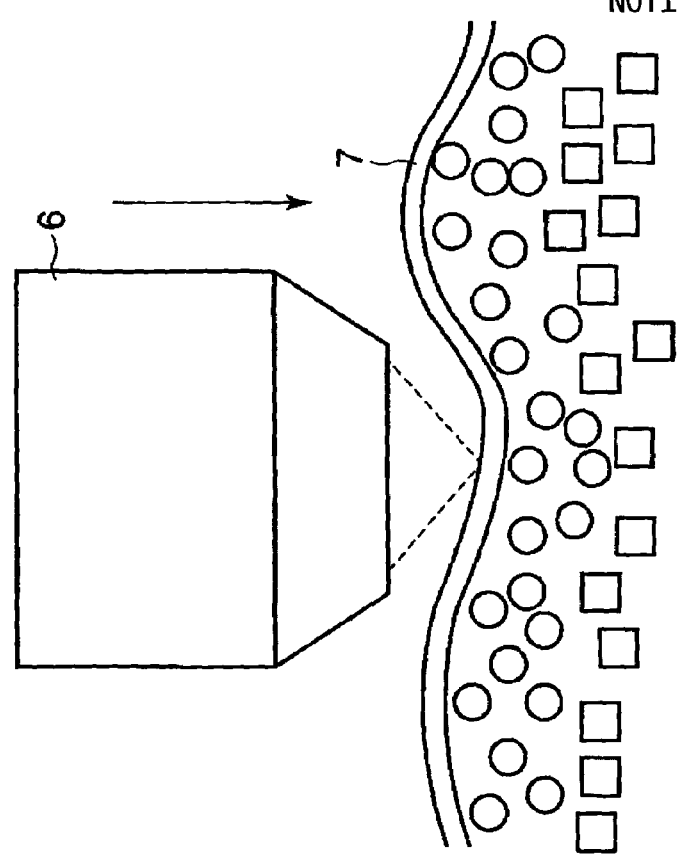

EXAMINATION APPARATUS AND FOCUSING METHOD OF EXAMINATION APPARATUS

BACKGROUND OF THE INVENTION

1. Field of the Invention

The present invention relates to a focusing method for an examination apparatus, such as a microscope, that can observe fluorescence emitted from a specimen.

2. Description of Related Art

In the related art, fluorescence microscopes are known examination apparatuses. In fluorescence microscopes, excitation light from a light source is focused onto a specimen by an objective lens, fluorescence emitted from the specimen passes through the objective lens and is focused by an imaging lens, and the fluorescence is transmitted through a prism disposed inside a lens barrel to form an image.

In the fluoroscopy carried out with such a fluorescence microscope, the following steps are performed: (a) first, the specimen is initially focused; (b) next, the illumination intensity of the light source is reduced; (c) at the same time, the sensitivity of a photosensor is increased; and (d) the focal position is finely adjusted. While viewing the acquired images, steps (b) and (c) are repeated until a suitable image is displayed, whereupon fluoroscopy can be carried out.

However, many operations are involved in such fluoroscopy, such as performing coarse adjustment and fine adjustment of the focal position while adjusting the illumination intensity. Therefore, this method suffers from the problem that an operator who is unaccustomed to such operations may easily make a mistake.

In addition, recently there have been more applications involving examination of protein-containing specimens (such as GFP). With such protein-containing specimens, however, the fluorescence intensity is very low. Therefore, if the focusing in step (a) described above takes too long or if the illumination intensity for quickly carrying out the focusing in step (a) is increased too much, the level of fluorescence from the specimen decreases due to bleaching of the specimen. This results in a problem in that fluoroscopy cannot be achieved.

On the other hand, scanning laser microscopes have recently been gathering attention. In such microscopes, laser light serving as excitation light is two-dimensionally scanned onto a specimen, fluorescence generated in the specimen passes through a pinhole and is detected in a detector, and the output of the detector is converted to a digital signal. Thereafter, the digital signal is stored in a memory and is displayed as an image. These scanning laser microscopes also have a focus adjusting function for adjusting the focal position of the image.

Japanese Unexamined Patent Application Publication No. HEI-9-218355 discloses an example of a focus adjusting method for a scanning laser microscope. In this method, initially a pinhole is removed from the light path and the focal position is roughly found, based on non-confocal detection, with a photodetector. Then, the pinhole is inserted into the light path and confocal detection is performed with the detector to more precisely find the focal position.

However, in the focusing method in Japanese Unexamined Patent Application Publication No. HEI-9-218355, when using a protein-containing specimen or the like whose fluorescence intensity is extremely low, it also takes a long time to roughly detect the focus position with the non-confocal detection. In order to more quickly perform detection of the focus position with non-confocal detection, the laser beam intensity can be increased; however, if the laser beam intensity is increased too much, there is a problem in that the fluorescence becomes reduced due to bleaching of the specimen, which makes it difficult to perform fluoroscopy.

BRIEF SUMMARY OF THE INVENTION

In light of the problems described above, it is an object of the present invention to provide an examination apparatus and a focusing method for an examination apparatus in which focusing for fluoroscopy can be performed quickly and easily.

In a first aspect, the present invention provides a focusing method for an examination apparatus that can observe fluorescence emitted from a specimen, the focusing method including a first step of irradiating the specimen with light via an objective lens to generate reflected light and fluorescence; a second step of performing focusing with respect to the surface of the specimen using the reflected light from the specimen; and a third step of performing focusing for the fluorescence based on the focal position of the specimen surface detected in the second step.

In a second aspect, the present invention provides a focusing method for an examination apparatus according to the first aspect, wherein in the second step, the focal position for the surface of the specimen is detected from the luminance of the reflected light from the specimen, and in the third step, focusing is performed for the fluorescence from the luminance of the fluorescence from the focal position detected in the second step.

In a third aspect, the present invention provides a focusing method for an examination apparatus according to the second aspect, wherein in the third step, a gain for detecting the luminance of the fluorescence from the focal position is adjusted so as to increase.

In a fourth aspect, the present invention provides a focusing method for an examination apparatus according to one of the first to third aspects, wherein in the third step, the focal position is moved in the inward direction of the specimen from the focal position detected in the second step and focusing for the fluorescence is performed.

In a fifth aspect, the present invention provides a focusing method for an examination apparatus that can observe fluorescence emitted from a specimen, the focusing method including a first step of irradiating the specimen with light via an objective lens to generate reflected light and fluorescence; a second step of performing focusing with respect to the surface of the specimen using the reflected light from the specimen; and a third step of performing examination for the fluorescence based on the focal position of the specimen surface detected in the second step.

In a sixth aspect, the present invention provides a focusing method for an examination apparatus according to the fifth aspect, wherein in the first step, part of the specimen surface is irradiated with light to generate the reflected light.

In a seventh aspect, the present invention provides a focusing method for an examination apparatus that can observe fluorescence emitted from a specimen, the focusing method including a first step of irradiating the specimen with light via an objective lens to generate reflected light and fluorescence; a second step of performing focusing with respect to the surface of the specimen using an acquired reflected-light image of the specimen; and a third step of performing focusing for the fluorescence using an acquired fluorescence image based on the focal position for the specimen surface detected in the second step.

In an eighth aspect, the present invention provides a focusing method for an examination apparatus according to the seventh aspect, wherein in the third step, the focal position for the fluorescence examination is corrected based on the chromatic aberration of the objective lens.

In a ninth aspect, the present invention provides a focusing method for an examination apparatus according to the seventh or eighth aspect, wherein in the second and third steps, acquired images are obtained by means of a mechanism producing a confocal effect.

In a tenth aspect, the present invention provides a focusing method for an examination apparatus according to one of the first to ninth aspects, wherein a variable focus lens having a focus-varying part is used as the objective lens.

In an eleventh aspect, the present invention provides an examination apparatus in which a focusing method according to one of the first to tenth aspects is used.

With the present invention, since focusing is performed using reflected light from the surface of the specimen followed by focusing for fluorescence using this focal position as a basis, it is possible to quickly and easily perform fluoroscopy even if the level of fluorescence emitted from the specimen is low, which normally makes focusing difficult.

Also, with the present invention, since the operations up to focusing for fluorescence can be performed quickly, it is possible to keep any damage to the specimen, such as bleaching, to a minimum, which allows stable and superior fluoroscopy to be realized.

BRIEF DESCRIPTION OF THE SEVERAL VIEWS OF THE DRAWINGS

FIGS. 6A and 6B are diagrams for explaining the focusing method according to the second embodiment.

DETAILED DESCRIPTION OF THE INVENTION

Embodiments of the present invention will be described below with reference to the drawings.

FIRST EMBODIMENT

Figure 1:
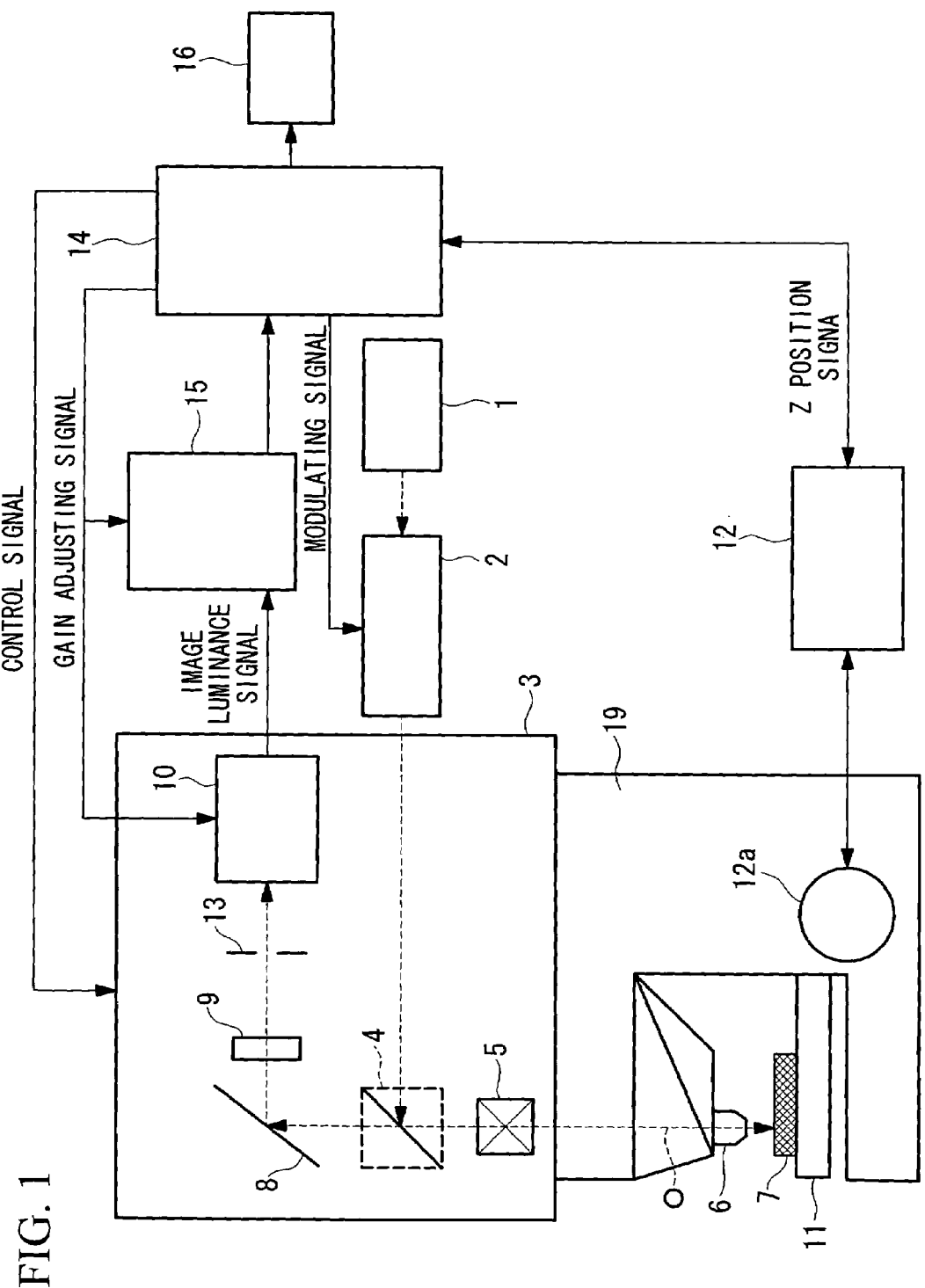
FIG. 1 schematically shows the configuration of a scanning laser microscope in which a focusing method according to a first embodiment of the present invention is employed.

FIG. 1 schematically shows the configuration of a scanning laser microscope in which a focusing method according to a first embodiment of the present invention is employed. In FIG. 1, reference numeral 1 represents a laser light source, and this laser light source 1 generates multispectral laser light.

A laser modulating unit 2 is disposed in the optical path of the laser light from the laser light source 1. The laser modulating unit 2 is formed, for example, of an AOTF (acousto-optic tunable filter), which can make the laser light from the laser light source 1 monochromatic and can adjust the intensity thereof based on a modulation signal from a system controller 14.

The laser light emitted from the laser modulating unit 2 is then introduced to an optical unit 3. In the optical unit 3, a cube 4 is disposed in the light path of the laser light emitted from the laser modulating unit 2. The cube 4 is mounted on a turret (not shown) and it can be replaced with another cube having different characteristics, either with a motor or manually. In this case, a cube having a half-mirror characteristic with 20% reflectivity and 80% transmission, and a cube having a dichroic mirror for reflecting the laser light from the laser light source 1 and transmitting fluorescence from a specimen 7 are used as the cube 4.

Galvano mirrors 5 are disposed in the reflected light path of the cube 4. The galvano mirrors 5 include a pair of mirrors for deflecting light in two orthogonal directions, thus scanning the laser light two-dimensionally (in the X and Y axial directions) with these mirrors.

The laser light scanned with the galvano mirrors 5 is then introduced to the microscope main body 19. In the microscope main body 19, a stage 11 on which the specimen 7 is mounted is disposed in the light path of the laser light scanned with the galvano mirrors 5, with an objective lens 6 disposed therebetween. The stage 11 is moved upwards and downwards (in the Z-axis direction) along the optical axis O of the objective lens 6 by a motor 12a that is controlled by a Z-axis controller 12. With this movement, the specimen 7 can be brought into focus by changing the relative distance between the objective lens 6 and the specimen 7. In this case, the Z-axis controller 12 is controlled by a Z-position signal from the system controller 14. Also, the displacement of the stage 11 is monitored by the Z-axis controller 12 and is sent back to the system controller 14.

With this configuration, the light emitted from the galvano mirrors 5 passes through the objective lens 6 and is focused onto the specimen 7 on the stage 11. Also, detection light (reflected light or fluorescence) emitted from the specimen 7 returns to the cube 4 via the objective lens 6 and the galvano mirrors 5.

A mirror 8 is disposed in the transmission light path of the cube 4. A barrier filter 9, a pinhole 13, and a photosensor 10 are disposed in the reflection light path of the mirror 8.

In this case, two types of element are used for the barrier filter 9: one having a characteristic whereby reflected light from the specimen 7 is transmitted, like the laser light from the laser light source 1, and another having a characteristic whereby only fluorescence wavelengths emitted from the specimen 7 are transmitted and other wavelengths are filtered. These two types of barrier filter 9 are mounted on a turret (not shown) and are selectively inserted into the light path based on a control signal from the system controller 14. The pinhole 13 is disposed at a confocal position, which is an optically conjugate position with respect to the focal point of the objective lens 6. The pinhole 13 serves as a confocal detector for the detection light (reflected light or fluorescence). The photosensor 10 detects the detection light confocally detected by the pinhole 13, and photoelectrically converts this detection light according to an adjustable gain signal from the system controller 14 to output an image luminance signal.

An image processing unit 15 is connected to the photosensor 10. The image processing unit 15 amplifies the image luminance signal from the photosensor 10 with a certain gain and offset according to a control signal from the system controller 14 to generate image data, and displays this image data on a monitor 16.

Figure 2:
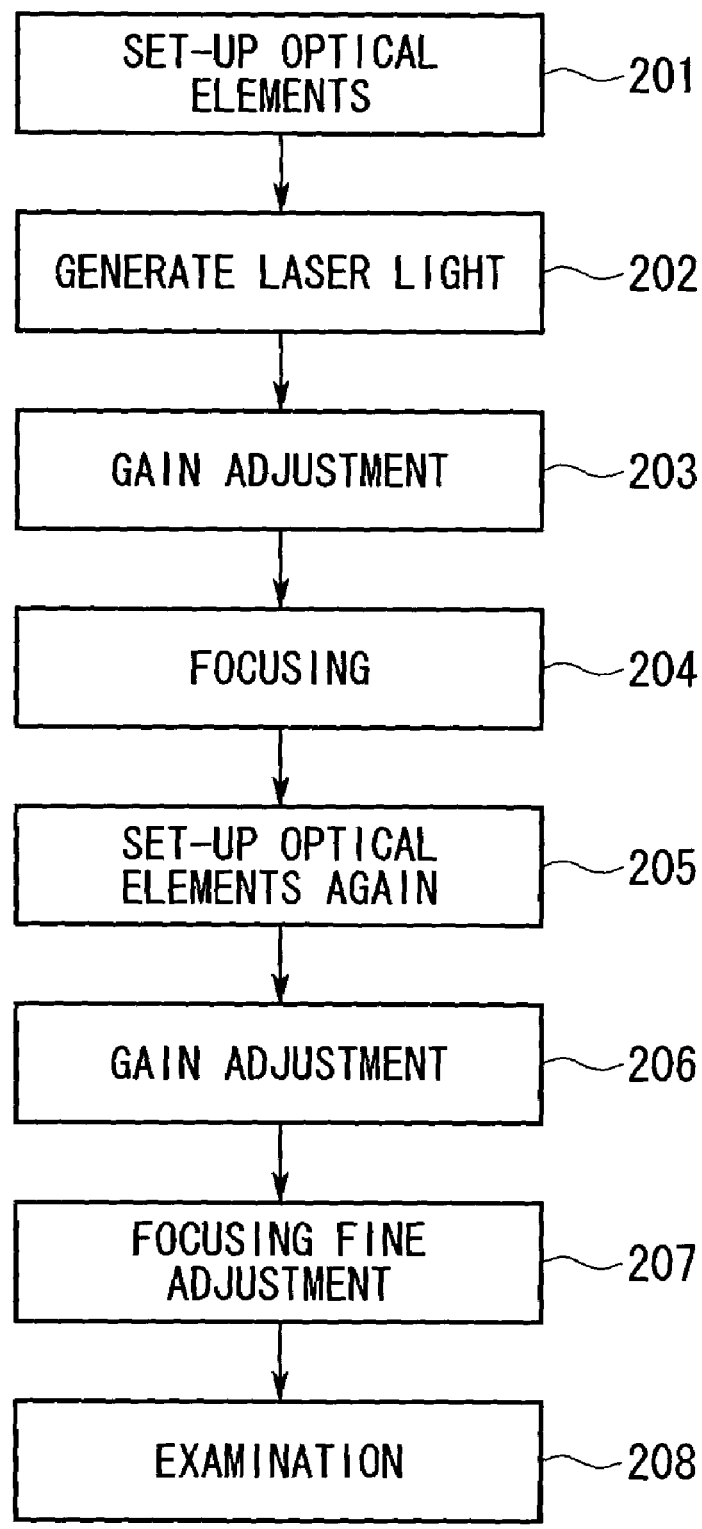
FIG. 2 is a flowchart for explaining the focusing method according to the first embodiment.

Next, a description of the focusing operation of the scanning laser microscope with this configuration will be described with reference to the flowchart shown in FIG. 2. First, in step 201, the optical elements are set-up. In this case, the cube 4 that has a half-mirror with 20% reflectivity and 80% transmission is inserted in the light path, and the barrier filter 9 having a characteristic whereby it transmits reflected light from the specimen 7 is also inserted in the optical path.

Next, in step 202, laser light is emitted from the laser light source 1. The laser light is attenuated by the half-mirror of the cube 4, is two-dimensionally scanned by the galvano mirrors 5, is incident on the objective lens 6, and is focused onto the specimen 7 on the stage 11. The light reflected at the surface of the specimen 7 returns to the cube 4 via the objective lens 6 and the galvano mirrors 5.

The half-mirror of the cube 4 transmits most of the reflected light from the specimen 7. The light transmitted through the half-mirror of the cube 4 is then reflected at the mirror 8, passes through the barrier filter 9, and is incident on the pinhole 13 where it is confocally detected. The reflected light confocally detected by the pinhole 13 is then received by the photosensor 10.

Next, in steps 203 and 204, focusing is carried out while adjusting the gain of the photosensor 10 and the image processing unit 15. In this case, the stage 11 is moved upwards and downwards (in the Z-axis direction) with the motor 12a by means of the Z-axis controller 12. With this movement of the stage 11, the intensity of the reflected light from the specimen 7 changes, and the luminance of the image data from the image processing unit 15, which is based on the image luminance signal from the photosensor 10, also changes. At this time, the system controller 14 ensures that the luminance of the image data does not become saturated by adjusting the gain of the photosensor 10 and the image processing unit 15.

Then, when the luminance of the image data from the image processing unit 15 is maximized, movement of the stage 11 is stopped. At this time, the position at which the stage 11 is stopped defines the focal position of the surface of the specimen 7.

The reason why focusing is carried out using reflected light from the specimen 7 is because the reflected light is brighter than the fluorescence, generally a few tens to a few hundred times brighter.

Next, in step 205, the optical elements are set-up again. In this case, the cube 4 that has a dichroic mirror for reflecting laser light from the laser light source 1 and for transmitting fluorescence from the specimen 7 is inserted in the light path, and the barrier filter that has a characteristic whereby it transmits fluorescence from the specimen 7 is also inserted in the light path.

With this configuration, the fluorescence emitted from the specimen 8 in response to laser light excitation returns to the cube 4 via the objective lens 6 and the galvano mirrors 5, is reflected at the mirror 8, is transmitted through the barrier filter 9, and is incident on the pinhole 13 where it is confocally detected. The fluorescence confocally detected at the pinhole 13 is then received by the photosensor 10.

Next, is steps 206 and 207, fine focusing adjustment is carried out based on the fluorescence while adjusting the gain of the photosensor 10 and the image processing unit 15. In this case, since the fluorescence is less bright than the reflected light, gain adjustment is performed so as to increase the gain of the photosensor 10 and the image processing unit 15.

In this case, the stage 11 is moved with the motor 12a by means of the Z-axis controller 12. Cells are often used as the specimen 7 in fluoroscopy, and the nucleus or strands in the cells are marked with a fluorescent sample to carry out examination. Because of this, focusing of the interior of the specimen 7 is often carried out as opposed to focusing of the surface of the specimen 7 with reflected light, as described above.

Therefore, the stage 11, which is positioned at the focal position for the surface of the specimen 7 based on reflected light, must be moved further towards the interior of the specimen 7. Then, the movement of the stage 11 should be stopped at the point where the luminance of the image data from the image processing unit 15 is maximized. The position of the stage 11 at this point then defines the focal position for the fluorescence emitted from the specimen 7.

Thereafter, fluoroscopy is carried out in step 208.

Accordingly, since focusing is initially performed using reflected light from the surface of the specimen 7 followed by focusing for fluorescence using this focal position as a basis, it is possible to quickly and easily perform focusing for fluoroscopy even when the intensity of fluorescence emitted from the specimen 7 is low, which normally makes focusing difficult.

Also, since focusing of the specimen 7 for fluoroscopy can be carried out in a short time, any damage such as bleaching of the specimen is kept to a minimum, which allows stable, superior fluoroscopy to be realized.

Furthermore, since the fluorescence focusing operation is carried out after focusing based on the reflected light and is performed only towards the interior of the specimen 7, no unnecessary operations are required up to the fluorescence focusing, which allows focusing to be carried out efficiently.

The above-described series of operations may be incorporated as a function of the microscope. In this case, for example, by providing a button on the GUI (graphical user interface) of an application, the operator can press the button to automatically carry out these operations under program control.

Figure 3:
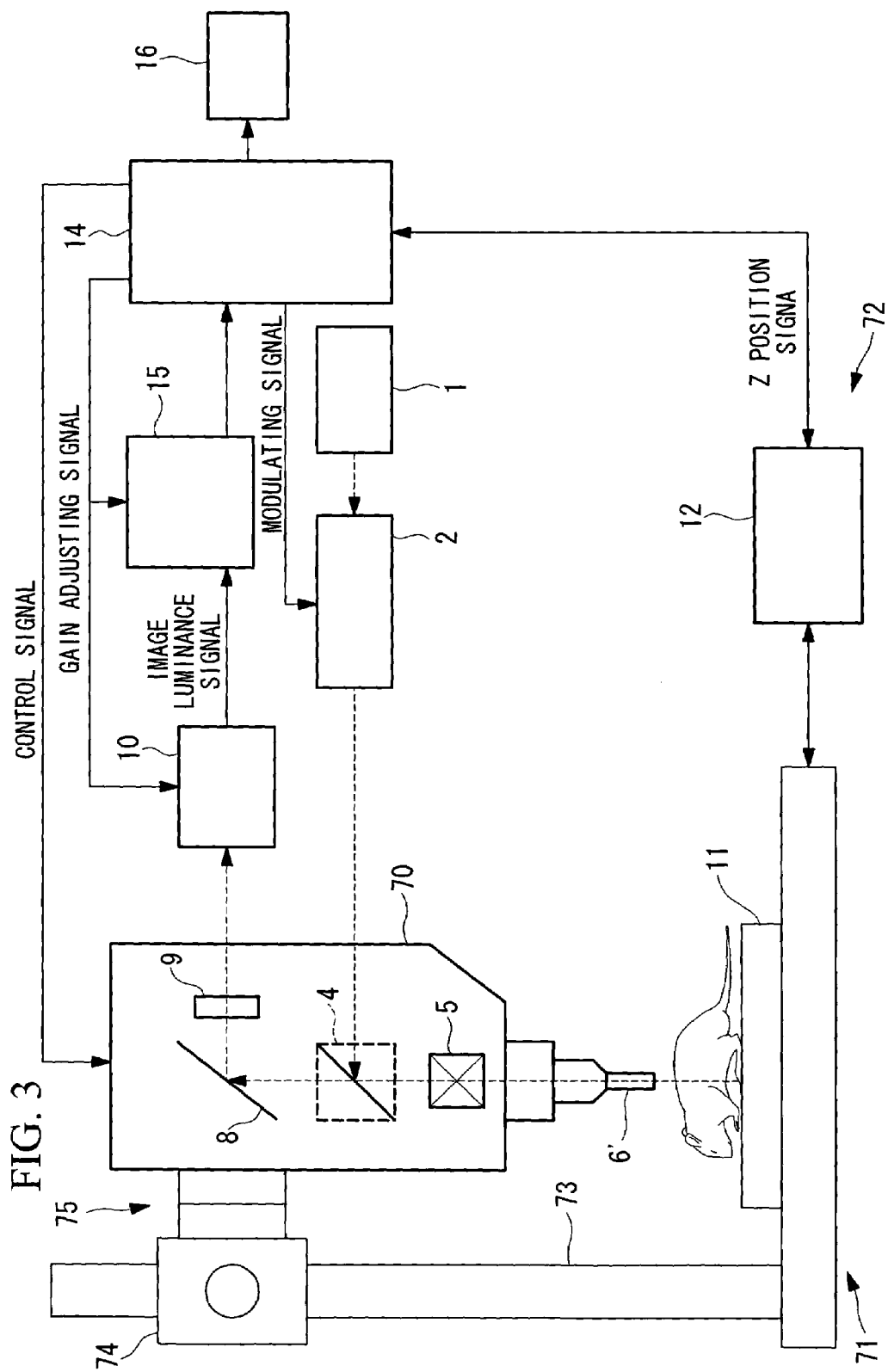
FIG. 3 shows a modified example of a scanning laser microscope in which a focusing method according to a first embodiment of the present invention is employed.

As a scanning laser microscope in which a focusing method according to the first embodiment of the present invention is employed, a scanning laser microscope 72 as shown in FIG. 3 may be used which comprises a small scan head 70 having an objective lens 6' with a small diameter, the tip of which is to be brought close to or inserted into a small experimental animal, that is a specimen 7, and a support 71 which supports the scan head 70 in a manner such that the position of the scan head 70 is adjustable. In this case, it is preferable that the photosensor 10 be disposed outside the scan head 70 so as to facilitate handing of the scan head 70. Reference numeral 73 represents a support stand, reference numeral 74 represents a vertically movable member, and reference numeral 75 represents an angle adjusting member.

This scanning laser microscope 72 allows observation of the specimen 7 such as a mouse in a living state by inserting the objecting lens 6' with a small diameter into the specimen 7 such as a mouse with a low level of invasiveness. In this case, the specimen 7 such as a mouse can be observed from a desired direction by raising or lowering the vertically movable member 74 with respect to the support stand 73 and adjusting the angle of the scan head 70 using the angle adjusting member 75 so as to adjust the position of the tip of the objective lens 6' and the angle of the objective lens 6'.

SECOND EMBODIMENT

Next, a second embodiment of the present invention will be described.

Figure 4:
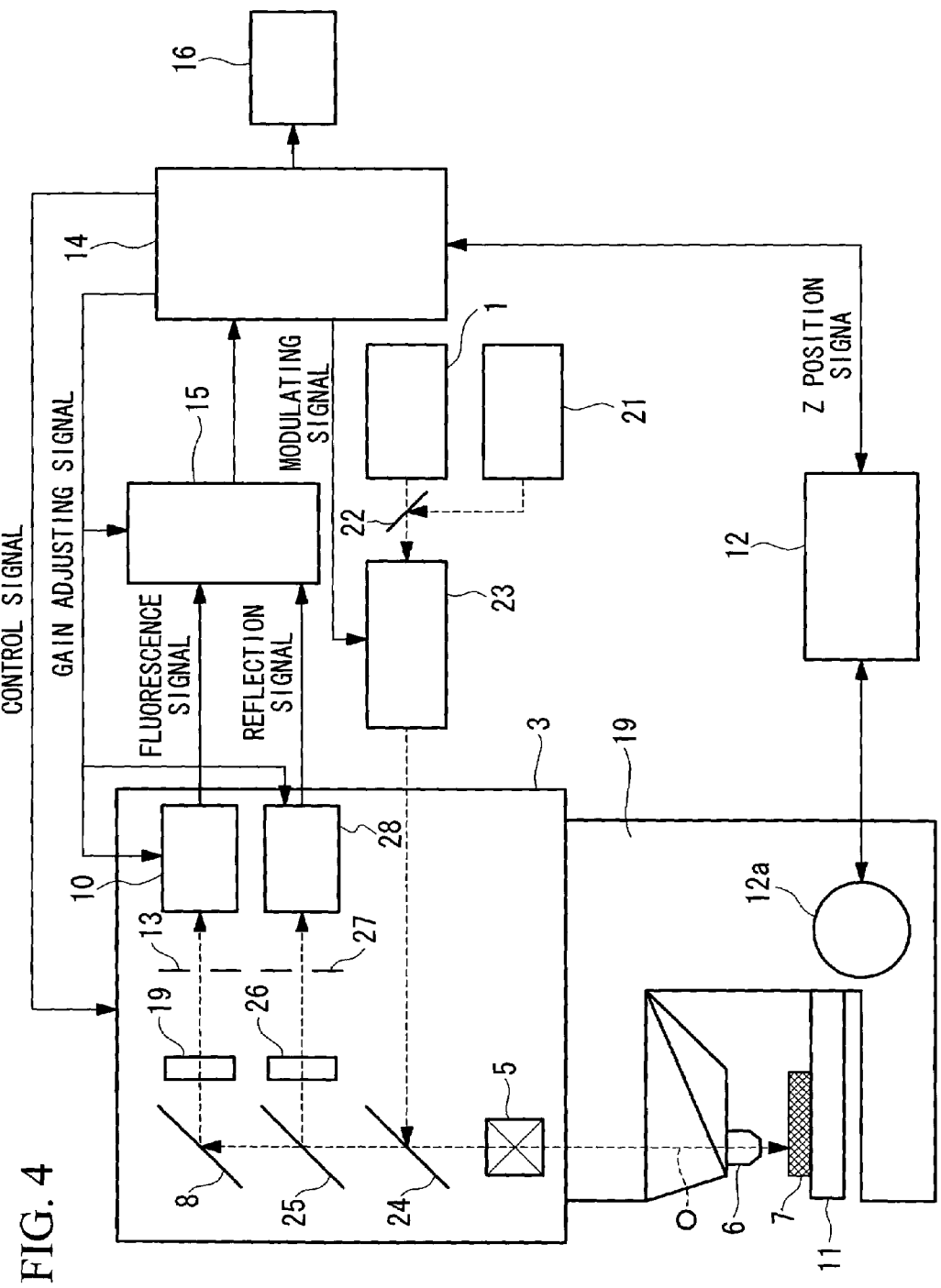
FIG. 4 schematically shows the configuration of a scanning laser microscope in which a focusing method according to a second embodiment of the present invention is employed.

FIG. 4 schematically shows the configuration of a scanning-laser microscope using a focusing method according to the second embodiment of the present invention. The same parts as shown in FIG. 1 are assigned the same reference numerals.

In this case, a laser light source 21 is provided in addition to the laser light source 1. Also, a half-mirror 22 is disposed in the light path of the laser light from the laser light source 1. Since this half-mirror transmits laser light from the laser light source 1 and reflects laser light from the laser light source 21, the laser beams from the laser light sources 1 and 21 are combined onto the same light path.

The laser light source 1 is for generating reflected light at the specimen 7. The laser light source 21 is for exciting fluorescence in the specimen 7, and therefore, an optimum light source that matches the excitation wavelength for exciting fluorescence in the specimen 7 is used. If a device that can output a plurality of wavelengths with a single laser light source is used, only one of the laser light sources 1 and 21 is required.

A laser modulating unit 23 is disposed in the emission light path of the half-mirror 22. This laser modulating unit 23 is formed of an AOTF (acousto-optic tunable filter), like that described above, which allows the intensity of the laser light from the laser light sources 1 and 21 to be modulated. In addition, since the light modulation can be changed at a speed sufficiently higher than the image sampling speed, the light modulating unit 23 can be turned on and off to limit the scanning region of the laser light from the laser light source 1. For example, even though the region scanned on the specimen by the galvano mirrors is a rectangular raster-scanning region, it is possible to make the region irradiated with laser light circular by suitably turning the laser modulating unit 23 on and off.

A half-mirror 24 is disposed in the light path of the laser light emitted from the laser modulating unit 23. This half mirror has a reflectivity of 20% and a transmission of 80%.

A structure including the above-described galvano mirrors 5 is disposed in the reflection light path from the half-mirror 24, and a dichroic mirror 25 and a mirror 8 are disposed in the transmission light path. The dichroic mirror 25 has a characteristic whereby it reflects the laser light from the laser light source 1 and transmits fluorescence from the specimen 7. A barrier filter 26, a pinhole 27, and a photo-sensor 28 are disposed in the reflection light path of the dichroic mirror 25.

The barrier filter 26 transmits only the wavelength of the laser light from the laser light source 1. The pinhole 27 is disposed at a confocal position, which is an optically conjugate position with respect to the focal point of the objective lens 6; therefore, the pinhole 17 serves to confocally detect the reflected light. The photosensor 28 is for detecting the reflected light confocally detected by the pinhole 27; the photosensor 28 photoelectrically converts the detection light according to a variable gain signal from the system controller 14 to output an image luminance signal.

A barrier filter 9, a pinhole 13, and a photosensor 10, like those shown in FIG. 1, are disposed in the reflection light path of the mirror 8. The barrier filter 9 used here has a characteristic whereby it transmits only the fluorescence wavelength emitted by the specimen 7 and filters other wavelengths.

The image processing unit 15 amplifies the image luminance signal from the photosensor 10 or 28 with a certain gain and offset, according to a control signal from the system controller 14, to produce image data, and displays this image data on the monitor 16.

The remaining configuration is the same as that shown in FIG. 1.

Figure 5:
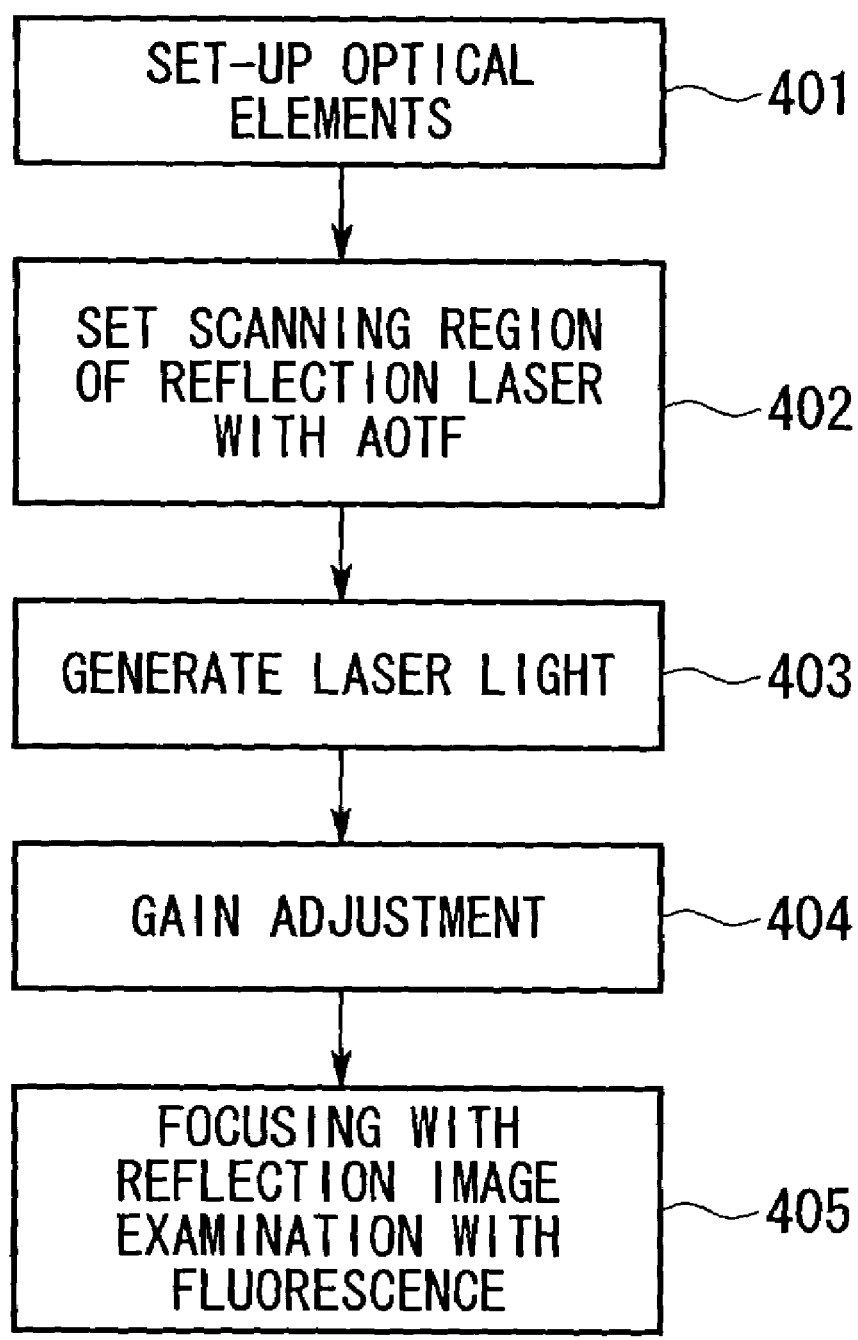
FIG. 5 is a flowchart for explaining the focusing method according to the second embodiment.

Next, the focusing operation of the scanning-laser microscope with this configuration will be described with reference to the flowchart in FIG. 5.

First, in step 401, the optical elements are set-up. In this case, an element having 20% reflectivity and 80% transmission is used as the half-mirror 24; and element having a characteristic whereby it reflects the laser light from the laser light source 1 and transmits fluorescence from the specimen 7 is used as the dichroic mirror 25; an element that transmits only the wavelength of the laser light from the laser light source 1 is used as the barrier filter 26; and an element that transmits only the fluorescence wavelength emitted by the specimen 7 and that filters the other wavelengths is used as the barrier filter 9.

Next, in step 402, the scanning region on the specimen 7 of the laser light from the laser light source 1 is set using the laser modulating unit 23. In this case, the scanning region set with the laser modulating unit 23 can be arbitrarily selected by the user; if only a part of the specimen 7 is to be scanned, only a part of the scanning region raster scanned by the galvano mirrors 5 is selected, for example, the edges or center of the scanning region.

Next, in step 403, laser light is generated by the laser light sources 1 and 21. The laser light from the laser light sources 1 and 21 is reflected at the half-mirror 24, is incident on the objective lens 6 via the galvano mirrors 5, and is focused onto the specimen 7 on the stage 11. In this case, the laser light from the laser light source 21 irradiates the scanning region on the specimen 7 according to the raster scanning of the galvano mirrors 5, whereas the laser light from the laser light source 1 illuminates only a part of the scanning region specified by the laser modulating unit 23.

The fluorescence and reflected light coming from the specimen 7 return to the half-mirror 24 via the objective lens 6 and the galvano mirrors 5, and then pass through the half-mirror 24 to be incident on the dichroic mirror 25. The reflected light from the specimen 7 is reflected at the dichroic mirror 25, is transmitted through the barrier filter 26, and is incident on the pinhole 27 to be confocally detected thereat. The reflected light confocally detected at the pinhole 27 is then received at the photosensor 28. On the other hand, the fluorescence from the specimen 7 is transmitted through the dichroic mirror 25, is reflected at the mirror 8, is transmitted through the barrier filter 9, and is incident on the pinhole 13 to be confocally detected thereat. The light confocally detected at the pinhole 13 is then received at the photosensor 10.

Next, in steps 404 and 405, fluoroscopy can be carried out at the same time as adjusting the gain of the photosensor 28 and the image processing unit 15 and performing focusing. In this case, to perform focusing, the stage 11 is moved upwards and downwards (in the Z-axis direction) with the motor 12a by means of the Z-axis controller 12, to find the position where the luminance of the image data in the image processing unit 15 is maximized, and this position defines the focal position. At this time, the system controller 14 ensures that the luminance of the image date (reflection image) does not become saturated by adjusting the gain of the photosensor 28 and the image processing unit 15.

On the other hand, the fluorescence received at the photosensor 10 is photoelectrically converted and is input to the image processing unit 15 as an image luminance signal. The image processing unit 15 amplifies the image luminance signal from the photosensor 10 with a certain gain and offset based on a control signal from the system controller 14 to generate image data, and displays this image data on the monitor 16 as a fluorescence image.

Accordingly, with this configuration, focusing is carried out using the reflected light from the surface of the specimen 7, and a fluorescence image can be examined while viewing the image at this focal point. As a result, when carrying out in-vivo examination using a living organism of an experimental animal as the specimen, as well as in in-vitro examination, even if the specimen moves during examination and causes the image to become out of focus, it is possible to quickly refocus using the reflection image, which allows examination to be carried out efficiently. These operations can be carried out by the user or they can be carried out automatically under the control of the system controller 14.

Also, since the region from which reflected light is obtained from the specimen 7 can be restricted to a plane or point forming part of the scanning region, it is possible to keep any damage to the specimen, such as bleaching, to a minimum, which enables superior fluoroscopy to be realized.

Separate light sources, that is, the laser light source 1 for reflected light and the laser light source 21 for excitation, are used in the embodiment described above; however, if reflection images and fluorescence images can be suitably acquired with a single laser light source, it is possible to obtain both reflection images and fluorescence images with the laser light source 1 or 21.

In the description given above, the reflected light from the specimen 7 is transmitted through the barrier filter 26 and is incident on the pinhole 27; however, the pinhole 27 for reflected light may be set to a have a large diameter or a small diameter, depending on the application. These diameters are set by a program provided in the system controller 14 in advance, and can be automatically selected.

FIGS. 6A and 6B show the relationship between the focal position and the image luminance for cases where the specimen 7 and the objective lens 6 are used confocally and non-confocally. First, when the pinhole diameter of the pinhole 27 is set large, no confocal effect occurs and therefore a non-confocal mode is used. In this mode, when the focal position is close to the surface of the specimen 7, the image luminance relationship is shown by curve A in FIG. 6B, and a blurred image is observed. In such a case, the surface of the specimen 7 is generally brought into focus using an autofocus technique. On the other hand, when the pinhole diameter of the pinhole 27 is set small, the relationship between focal position and image luminance of the specimen 7 is as shown by curve B in FIG. 6B. In this case, when fluorescence is produced at a cell inside the specimen 7, the luminance is low at a focal position outside the specimen 7 and rapidly rises as the focal position moves inside the specimen 7. Therefore, when the stage 11 is moved so as to bring the specimen 7 closer to the objective lens 6, if the focal position is set to a position where the image luminance exceeds a predetermined threshold value C, focusing can be easily carried out. Therefore, in the case of a living organism in which the surface or interior of the specimen 7 is to be examined, the focusing method using the confocal point is advantageous

THIRD EMBODIMENT

Next, a third embodiment of the present invention will be described.

Figure 7:
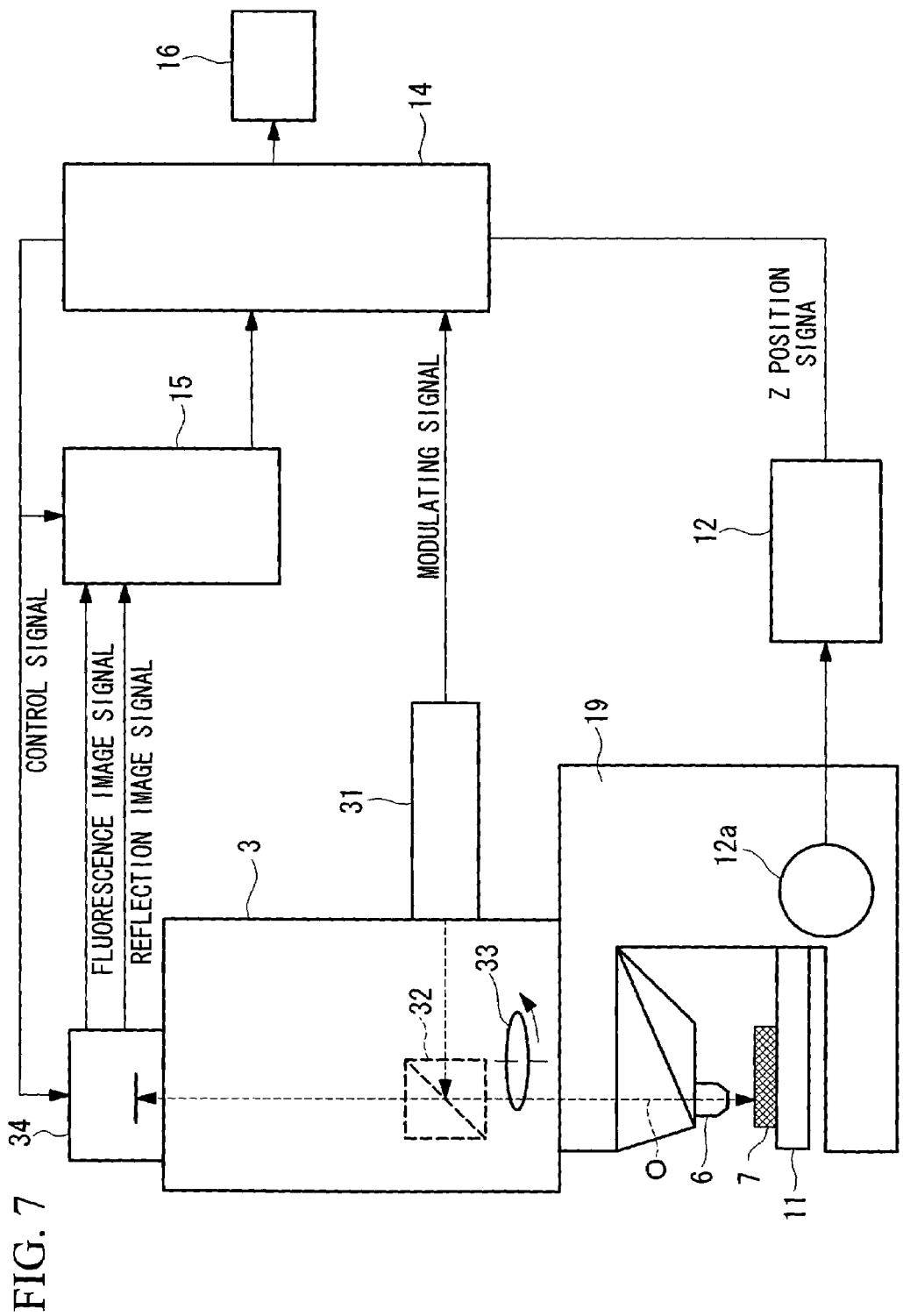
FIG. 7 schematically shows the configuration of a confocal microscope in which a focusing method according to a third embodiment of the present invention is employed.

FIG. 7 schematically shows the configuration of a confocal microscope in which a focusing method according to the third embodiment of the present invention is employed.

In this case, instead of the laser light source 1, a halogen lamp 31 is provided. The halogen lamp 31 introduces white light into the optical unit 3.

A cube 32 is disposed in the light path of the white light from the halogen lamp 31. The cube 32 is mounted on a turret (not shown) and can be replaced, either with a motor or manually, with another cube having different characteristics. In this case, a cube having a half-mirror with 20% reflectivity and 80% transmission and cube having a dichroic mirror that reflects light from the halogen lamp 31 and transmits fluorescence from the specimen 7 are used as the cube 32.

A rotating disk 33 is disposed in the reflection light path of the cube 32. The rotating disk 33 has slits formed in the circular disk surface, which allows a confocal effect to be obtained when the disk is rotated to transmit light.

The light passing through the rotating disk 33 is introduced into the microscope main body 19. In the microscope main body 19, the stage 11 on which the specimen 7 is mounted is disposed in the light path of the light passing through the rotating disk 33, with the objective lens 6 being disposed therebetween.

On the other hand a CCD camera 34 is disposed in the transmission light path of the cube 32. The CCD camera 34 acquires images of the detection light (reflected light or fluorescence) from the specimen 7, and outputs a reflection image signal or a fluorescence image signal based on a control signal from the system controller 14.

The image processing unit 15 is connected to the CCD camera 34. The image processing unit 15 amplifies the reflection image signal or the fluorescence image signal from the CCD camera 34 with a certain gain or offset based on a control signal from the system controller 14 to generate image data, and displays this image data on the monitor 16.

The system controller 14 can perform Z-axis control of the stage 11 on which the specimen 7 is mounted by means of a Z-axis controller 12, based on the reflection image signal or the fluorescence image signal. For example, the system controller 14 is capable of performing processing for setting the Z-axis position of the stage 11 at a point where the luminance of the reflection image signal is maximized.

Figure 8:
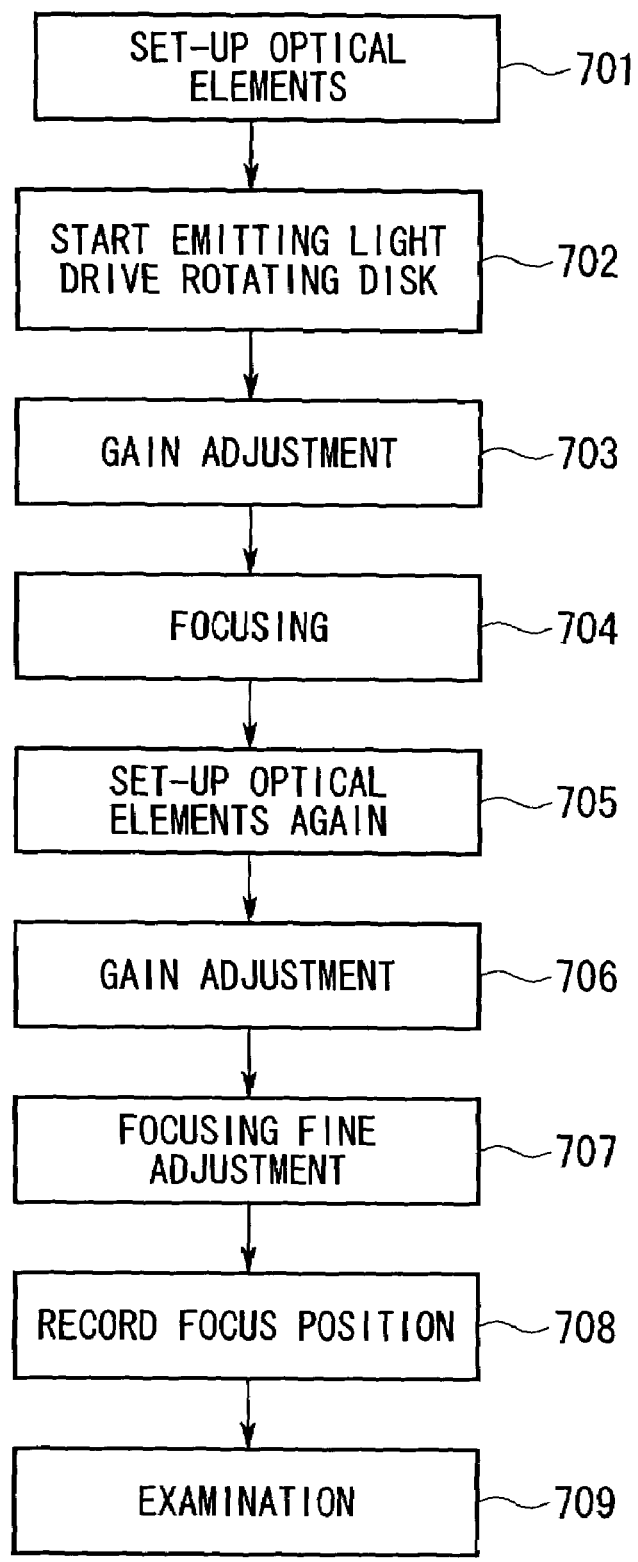
FIG. 8 is a flowchart for explaining the focusing method according to the third embodiment, FIG. 9 schematically shows a variable focus lens used in a fourth embodiment of the present invention.

Next, a focusing operation of the confocal microscope with this configuration will be described with reference to the flowchart shown in FIG. 8. First, in step 701, the optical elements are set-up. In this case, the cube 32 having the half-mirror with 20% reflectivity and 80% transmission is used.

Next, in step 702, the rotating disk 33 is rotated and light is irradiated from the halogen lamp 31. The light from the halogen lamp 31 is attenuated at the half mirror in the cube 32 and is introduced to the objective lens 6 via the rotating disk 33 to be focused onto the specimen 7 on the stage 11. The light reflected at the surface of the specimen 7 passes through the objective lens 6 and is incident on the rotating disk 33, where a confocal effect occurs. The reflected light is then transmitted by the half-mirror in the cube 32 and is imaged at the CCD camera 34.

Next, in steps 703 and 704, focusing is carried out while adjusting the gain and so on of the image processing unit 15. In this case, the reflection image acquired by the CCD camera 34 is transmitted as a reflection image signal to the system controller 14 via the image processing unit 15. The system controller 14 moves the stage 11 upwards and downwards (in the Z-axis direction) by means of the Z-axis controller 12, according to the reflection image signal, and finds a point where the luminance of the reflection image signal is maximized to set the focus position. At this time, the gain of the image from the image processing unit 15 is adjusted if necessary.

Next, in step 705, the optical elements are set-up again. In this case, the cube 32 having the dichroic mirror that reflects light from the halogen lamp 31 and that transmits fluorescence from the specimen 7 is used.

In this state, the fluorescence emitted from the specimen 7 in response to excitation with light from the halogen lamp 31 passes through the objective lens 6, is incident on the rotating disk 33, where a confocal effect occurs, and returns to the cube 32. The fluorescence is then transmitted through the dichroic mirror in the cube 32 and is imaged at the CCD camera 34.

The fluorescence image acquired by the CCD camera 34 is then sent to the image processing unit 15 as a fluorescence image signal. The image processing unit 15 amplifies the fluorescence image signal from the CCD camera 34 with a certain gain and offset, according to a control signal from the system controller 14, to generate image data, and displays the image data on the monitor 16 (step 706). By doing so, a focused fluorescence image that is not affected by the brightness of the fluorescent specimen is displayed on the monitor 16.

The focal planes of the reflection image and the fluorescence image acquired in this way may differ depending on the amount of the chromatic aberration of the objective lens 6. In this case, in step 707, the system controller 14 calculates in advance the difference in focal plane positions due to the chromatic aberration, calculates the position of the focal plane of the fluorescence image from the position of the focal plane at which the reflection image is focused, and performs correction by moving the stage 11 upwards and downwards (in the Z-axis direction) by means of the Z-axis controller 12.

Thereafter, in steps 708 and 709, the focal position thus obtained is recorded, and then fluoroscopy is carried out.

Therefore, the procedure up to fluoroscopy can be carried out quickly and in a straightforward manner even when the intensity of the fluorescence emitted from the specimen 7 is low, which normally make focusing difficult.

Focusing of the reflection image is automatically performed based on the luminance of the image acquired by the CCD camera 34, and focusing of the fluorescence image is carried out by calculating the chromatic aberration, which allows the focusing to be carried out with almost no intervention by the user. Also, since a confocal effect is obtained by using the rotating disk 33, more precise focusing can be achieved.

When defocusing occurs during fluoroscopy, it is possible to refocus again using the reflected light simply by changing the cube 32 to the one having the half-mirror. Also, since the CCD camera 34 is used, a higher frame rate is possible compared to a scanning-laser microscope, and it is also possible to carry out focusing quickly.

FOURTH EMBODIMENT

Next, a fourth embodiment of the present invention will be described.

Figure 9:
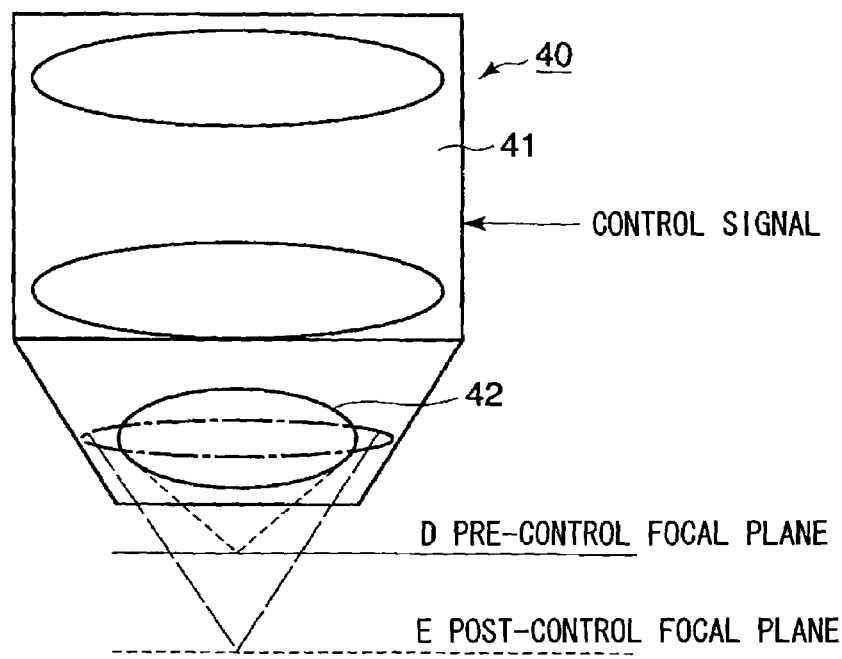

In the above-described embodiments, the stage 11 on which the specimen 7 is mounted is moved upwards and downwards; instead of this, however, a variable focus lens may be used. FIG. 9, schematically shows a variable focus lens. A focus-varying part 42 formed of a liquid crystal lens, a liquid lens, or the like is provided in the tip of an objective lens 41 to constitute a variable focus lens 40.

With this variable focus lens 40, when a control signal from a control unit (not shown) is applied to the focus-varying unit 42, a pre-control focal plane D can be moved to a post-control focal plane E.

Figure 10:
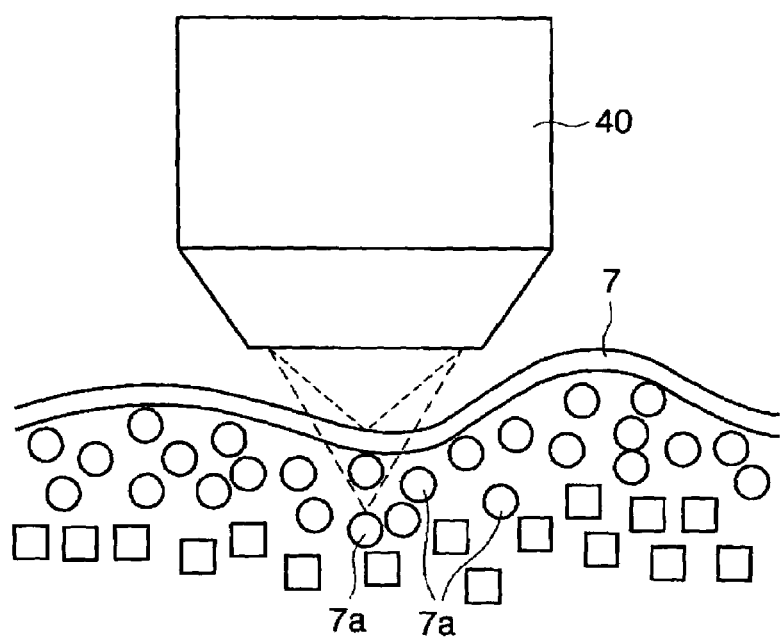
FIG. 10 is a diagram for explaining the focusing method of the fourth embodiment.

Since the focusing speed is much higher by using this variable focus lens 40 compared to moving the stage 11, the focusing operation can be performed more quickly. Also, as shown in FIG. 10, when cells 7a inside the specimen 7 are to be examined, bringing the objective lens 6 close to the specimen 7 after focusing at the surface of the specimen 7 with the above-described objective lens 6 involves a risk that the lens 6 will collide with the specimen 7. However, by using the variable focus lens 40, the variable focus lens 40 itself is not moved, and therefore, it is possible to examine the cell 7a inside the specimen 7 simply by moving the focal plane from D to E. Furthermore, using such a variable focus lens 40 as the objective lens 6 provides an advantage in that chromatic aberration mentioned in the fourth embodiment can be corrected.

FIFTH EMBODIMENT

Next, a fifth embodiment of the present invention will be described.

Figure 11:
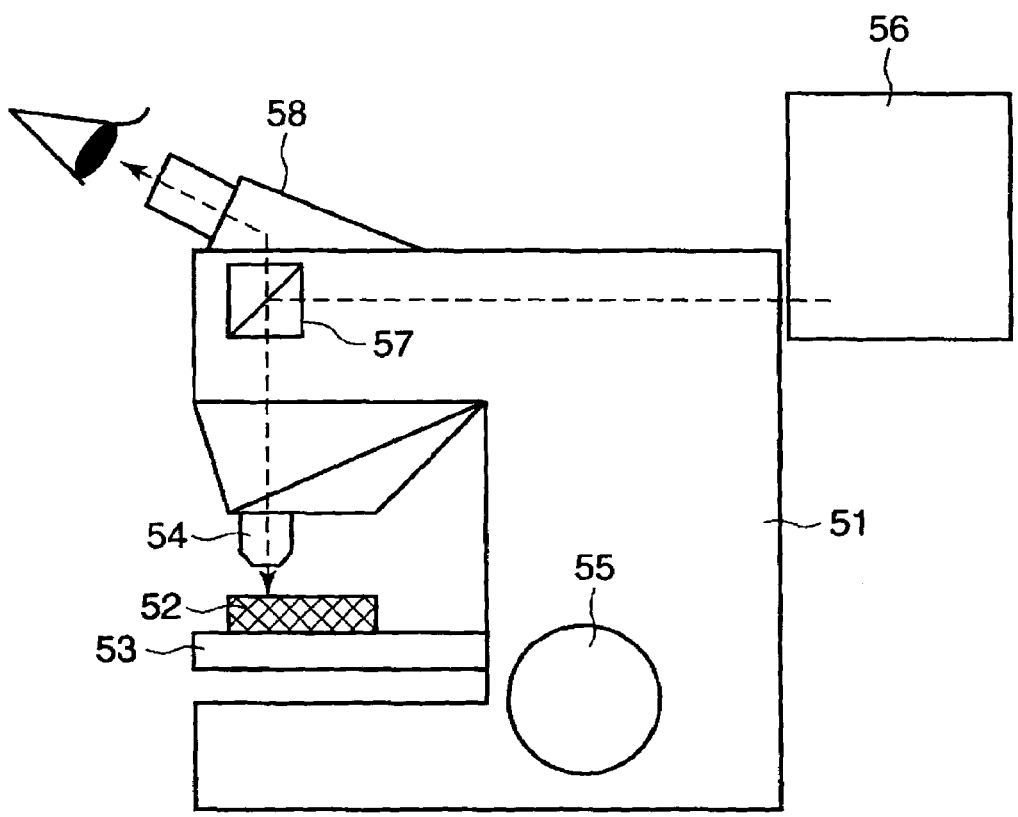
FIG. 11 schematically shows an optical microscope in which a focusing method according to a fifth embodiment of the present invention is employed.

FIG. 11 schematically shows the configuration of an optical microscope in which a focusing method according to the fifth embodiment of the present invention is employed.

Figure 12:
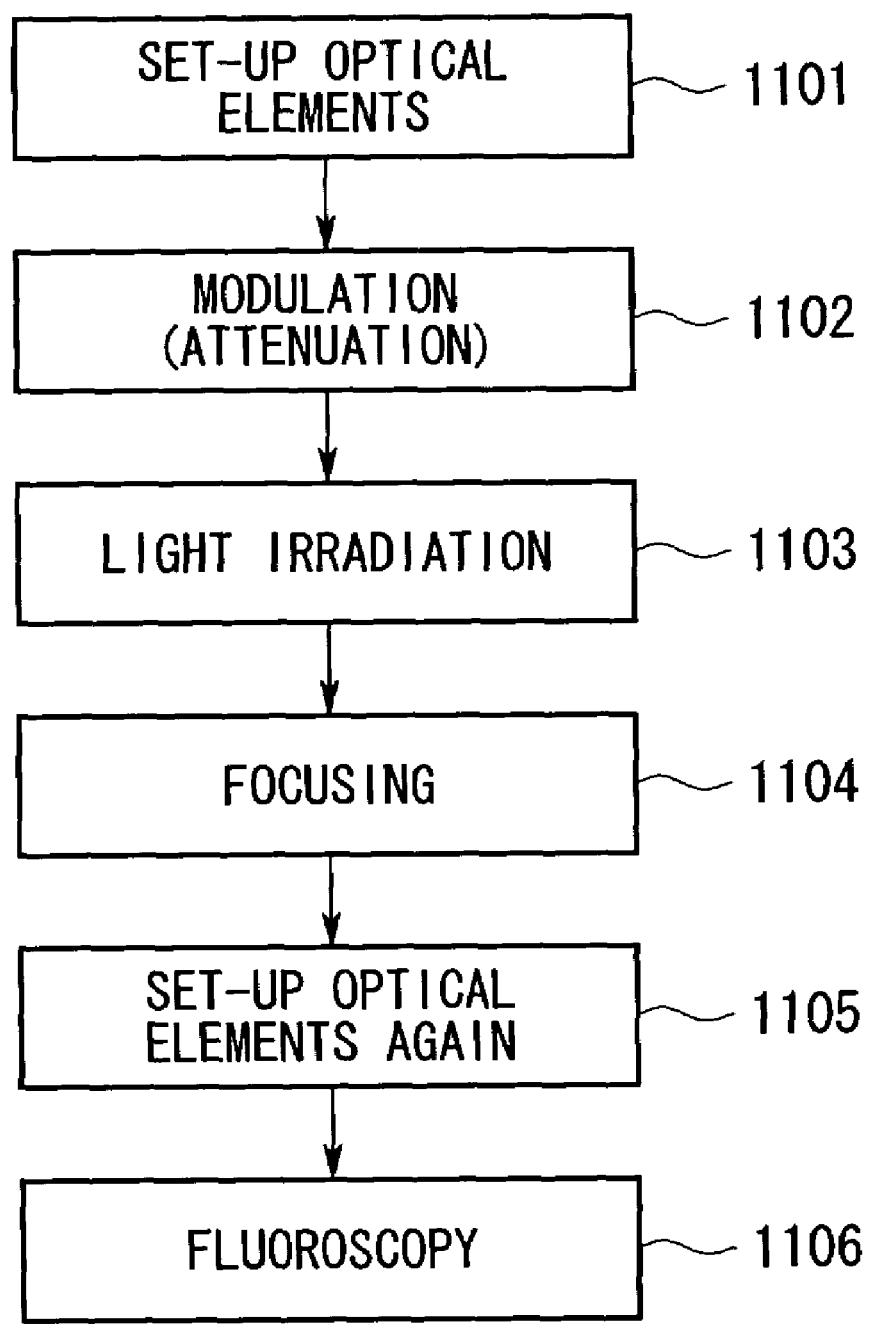
FIG. 12 is a flowchart for explaining the focusing method according to the fifth embodiment.

In FIG. 12, reference numeral 51 represents a microscope main body. A stage 53 on which a specimen 52 is mounted and an objective lens 54 are disposed in this microscope main body 51 so as to face each other. The stage 53 can be moved upwards and downwards (in the Z-axis direction) along the optical axis O of the objective lens 54 by turning a focusing knob 55. By changing the relative distance between the objective lens 54 and the specimen 52 with this movement, the specimen 52 can be brought into focus.

A lamp 56 serving as a light source is provided on the microscope main body 51. The lamp 56 emits white light. A cube 57 is disposed in the light path of the white light from the lamp 56. The cube 57 is provided inside the microscope main body 51 and can be replaced, either with a motor or manually, with another cube having different characteristics. In this case, a cube having a half-mirror with 20% reflectivity and 80% transmission and a cube having a dichroic mirror that reflects the white light from the lamp 56 and transmits detection light (reflection light or fluorescence) from the specimen 52 are used as the cube 57, and these can be exchanged.

A lens barrel 58 is disposed in the transmission light path of the cube 57. The lens barrel 58 allows visual observation of the detection light from the specimen 52, which is transmitted through the cube 57.

Next, the focusing operation of the optical microscope having this configuration will be described with reference to the flowchart shown in FIG. 12. First, in step 1101, the optical elements are set-up, namely, the cube 57 with the half-mirror is installed.

Next, in steps 1102 and 1103, the light from the lamp 56 is attenuated at the cube 57, is incident on the objective lens 54, and is focused onto the specimen 52 on the stage 53. The light reflected at the surface of the specimen 52 passes through the objective lens 54 and reaches the cube 57. The reflected light then passes through the cube 57 and is observed as a reflection image using the lens barrel 58.

Next, in step 1104, the stage 53 is moved upwards and downwards (in the Z-axis direction) by turning the focusing knob 55, to bring the specimen 52 into focus.

In step 1105, the optical elements are set-up again, this time to install the cube 57 with the dichroic mirror.

In this state, when light is radiated from the lamp 56, fluorescence excited in the specimen 52 reaches the cube 57 via the objective lens 54, is transmitted through the cube 57, and is observed as a fluorescence image with the lens barrel 58 (step 1106).

Therefore, the procedure up to fluoroscopy can be carried out quickly and in a straightforward manner even when the intensity of the fluorescence emitted from the specimen 52 is low, which normally make focusing difficult. Also, when a high-magnification lens is used as the objective lens 54, even if defocusing occurs, it is possible to easily recreate the original fluoroscopy state by performing focusing using the reflected light from the specimen 52.

Figure 13:
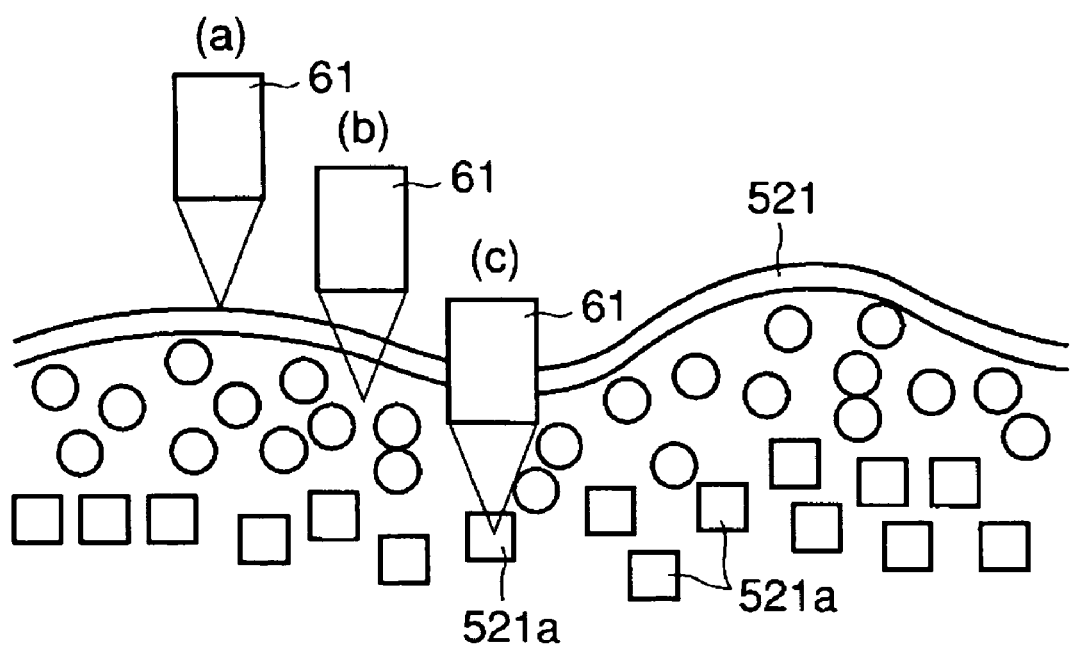
FIG. 13 is a diagram for explaining the focusing method of the fifth embodiment when a rigid-borescope objective lens is used.

This concept can be applied to a microscope apparatus in which a rigid-borescope objective lens is used for examining the internal organs of a living organism. FIG. 13 is an example using a rigid-borescope objective lens 61 of the type that is pressed against the surface 521 of an internal organ instead of the objective lens 54. As shown in (a) in FIG. 13, when the rigid-borescope objective lens 61 is separated from the internal organ surface 521, the internal organ surface 521 is brought into focus using the reflected light from the internal organ surface 521. Next, as shown in (b) in the same figure, a cell 521a, inside the internal organ surface 521, that emits fluorescence is brought into focus. In this case, when the cell 521a that emits fluorescence is located deeper below the internal organ surface 521, as shown in (c) in the same figure, the rigid-borescope objective lens 61 is inserted inside the internal organ surface 51, and in this state, the cell 521a that emits fluorescence is brought into focus. Naturally, the fluorescence inside the internal organ surface 521 may also be focused by placing the tip of the rigid-borescope objective lens 61 against the internal organ surface 521. Organ examination may be carried out when the organ is removed from the living organism. Also, in in-vivo examination, the rigid-borescope objective lens 61 may be inserted into an experimental animal to approach the organ to be examined.

In this examination apparatus, when using high-magnification lenses in the rigid-borescope objective lens 61, even if there is some defocus due to slight movement of the specimen 52, it is possible to easily return to the original fluoroscopy state by performing focusing using the initially reflected light from the specimen 52.

The present invention is not limited to the embodiments described above. Various modifications can be made without departing from the scope of the invention.

Furthermore, the embodiments described above include various aspects of the invention, and various aspects of the invention can be obtained by suitably combining the plurality of disclosed structural elements. For example, even when various structural elements are removed from the complete structure disclosed in the embodiments, so long as the problems described above in the Summary of the Invention can be overcome and the advantages described therein can be obtained, the configuration from which these structural elements are removed can be considered as the invention.

What is claimed is:

1. A focusing method for an examination apparatus that can observe fluorescence emitted from a specimen, the focusing method comprising:
   a first step of irradiating the specimen with light via an objective lens to generate reflected light and fluorescence;
   a second step of performing focusing with respect to the surface of the specimen using the reflected light from the specimen; and
   a third step of performing focusing for the fluorescence based on the focal position of the specimen surface detected in the second step;
   wherein in the second step, the focal position for the surface of the specimen is detected from the luminance of the reflected light from the specimen, and in the third step, focusing is performed for the fluorescence from the luminance of the fluorescence from the focal position detected in the second step.

2. A focusing method for an examination apparatus according to claim 1, wherein in the third step, a gain for detecting the luminance of the fluorescence from the focal position is adjusted so as to increase.

3. A focusing method for an examination apparatus according to claim 1, wherein a variable focus lens having a focus-varying part is used as the objective lens.

4. An examination apparatus using the focusing method according to claim 1.

5. A focusing method for an examination apparatus that can observe fluorescence emitted from a specimen, the focusing method comprising:
   a first step of irradiating the specimen with light via an objective lens to generate reflected light and fluorescence;
   a second step of performing focusing with respect to the surface of the specimen using the reflected light from the specimen; and
   a third step of performing focusing for the fluorescence based on the focal position of the specimen surface detected in the second step,
   wherein in the third step, the focal position is moved in the inward direction of the specimen from the focal position detected in the second step and focusing for the fluorescence is performed.

6. A focusing method for an examination apparatus according to claim 5, wherein a variable focus lens having a focus-varying part is used as the objective lens.

7. An examination apparatus using the focusing method according to claim 5.

8. A focusing method for an examination apparatus that can observe fluorescence emitted from an internal organ of a living organism, the focusing method comprising:
- bringing an objective lens of the examination apparatus close to the internal organ;
- a first step of irradiating the internal organ with light via the objective lens to generate reflected light and fluorescence;
- a second step of performing focusing with respect to the surface of the internal organ using the reflected light from the internal organ; and
- a third step of performing focusing for the fluorescence based on the focal position of the surface of the internal organ detected in the second step,
- wherein in the second step, the focal position for the surface of the internal organ is detected from the luminance of the reflected light from the internal organ, and in the third step, focusing is performed for the fluorescence from the luminance of the fluorescence from the focal position detected in the second step.

9. A focusing method for an examination apparatus according to claim 8, wherein a variable focus lens having a focus-varying part is used as the objective lens.

10. An examination apparatus using the focusing method according to claim 8.

11. A focusing method for an examination apparatus that can observe fluorescence emitted from an internal organ of a living organism, the focusing method comprising:
- bringing an objective lens of the examination apparatus close to the internal organ;
- a first step of irradiating the internal organ with light via the objective lens to generate reflected light and fluorescence;
- a second step of performing focusing with respect to the surface of the internal organ using the reflected light from the internal organ; and
- a third step of performing focusing for the fluorescence based on the focal position of the surface of the internal organ detected in the second step,
- wherein in the third step, the focal position is moved in the inward direction of the internal organ from the focal position detected in the second step and focusing for the fluorescence is performed.

12. A focusing method for an examination apparatus according to claim 11, wherein a variable focus lens having a focus-varying part is used as the objective lens.

13. An examination apparatus using the focusing method according to claim 11.

* * * * *